(12) United States Patent
Friggstad

(10) Patent No.: US 8,701,576 B2
(45) Date of Patent: Apr. 22, 2014

(54) SEED HOPPER FOR SEED METERING SYSTEM HAVING MODULAR SEED METERING UNITS

(75) Inventor: Terrance A. Friggstad, Grasswood (CA)

(73) Assignee: CNH Canada, Ltd., Saskatoon, Saskatchewan (CA)

( * ) Notice: Subject to any disclaimer, the term of this patent is extended or adjusted under 35 U.S.C. 154(b) by 302 days.

(21) Appl. No.: 12/985,483

(22) Filed: Jan. 6, 2011

(65) Prior Publication Data

US 2012/0174841 A1   Jul. 12, 2012

(51) Int. Cl.
*A01C 7/08*   (2006.01)

(52) U.S. Cl.
USPC .......................................... 111/182; 111/921

(58) Field of Classification Search
USPC ............. 111/170–185, 200, 900, 921; 701/50
See application file for complete search history.

(56) References Cited

U.S. PATENT DOCUMENTS

| | | |
|---|---|---|
| 5,024,173 A | 6/1991 | Deckler |
| 5,025,951 A | 6/1991 | Hook et al. |
| 5,632,212 A | 5/1997 | Barry |
| 6,145,455 A | 11/2000 | Gust et al. |
| 6,230,636 B1 * | 5/2001 | Bom et al. ..................... 111/13 |
| 7,377,221 B1 | 5/2008 | Brockmeier |
| 7,395,769 B2 | 7/2008 | Jensen |
| 7,497,176 B2 | 3/2009 | Dillman |
| 7,571,688 B1 | 8/2009 | Friestad et al. |
| 7,690,440 B2 | 4/2010 | Dean et al. |
| 2008/0085157 A1 * | 4/2008 | Villarreal et al. .............. 405/36 |

FOREIGN PATENT DOCUMENTS

| | | |
|---|---|---|
| DE | 10042790 | 3/2002 |
| EP | 376018 | 7/1990 |

* cited by examiner

*Primary Examiner* — Christopher J Novosad
(74) *Attorney, Agent, or Firm* — Rebecca L. Henkel

(57) ABSTRACT

The present invention is directed to a hopper for a seed metering system that has a series of individualized and independently controlled metering units. The hopper has a plurality of discharge openings that can be selectively opened and closed to expose an opening to a respective one of the plurality of metering units. Each seed metering unit is selectively driven by a common drive member, such as a drive shaft. When a seed metering unit is engaged with the drive member, the unit will meter granular material. On the other hand, when the seed metering unit is not engaged with the drive member, the metering unit will not meter granular material. Hence, the present invention provides a seed metering apparatus that provides effective sectional control.

12 Claims, 4 Drawing Sheets

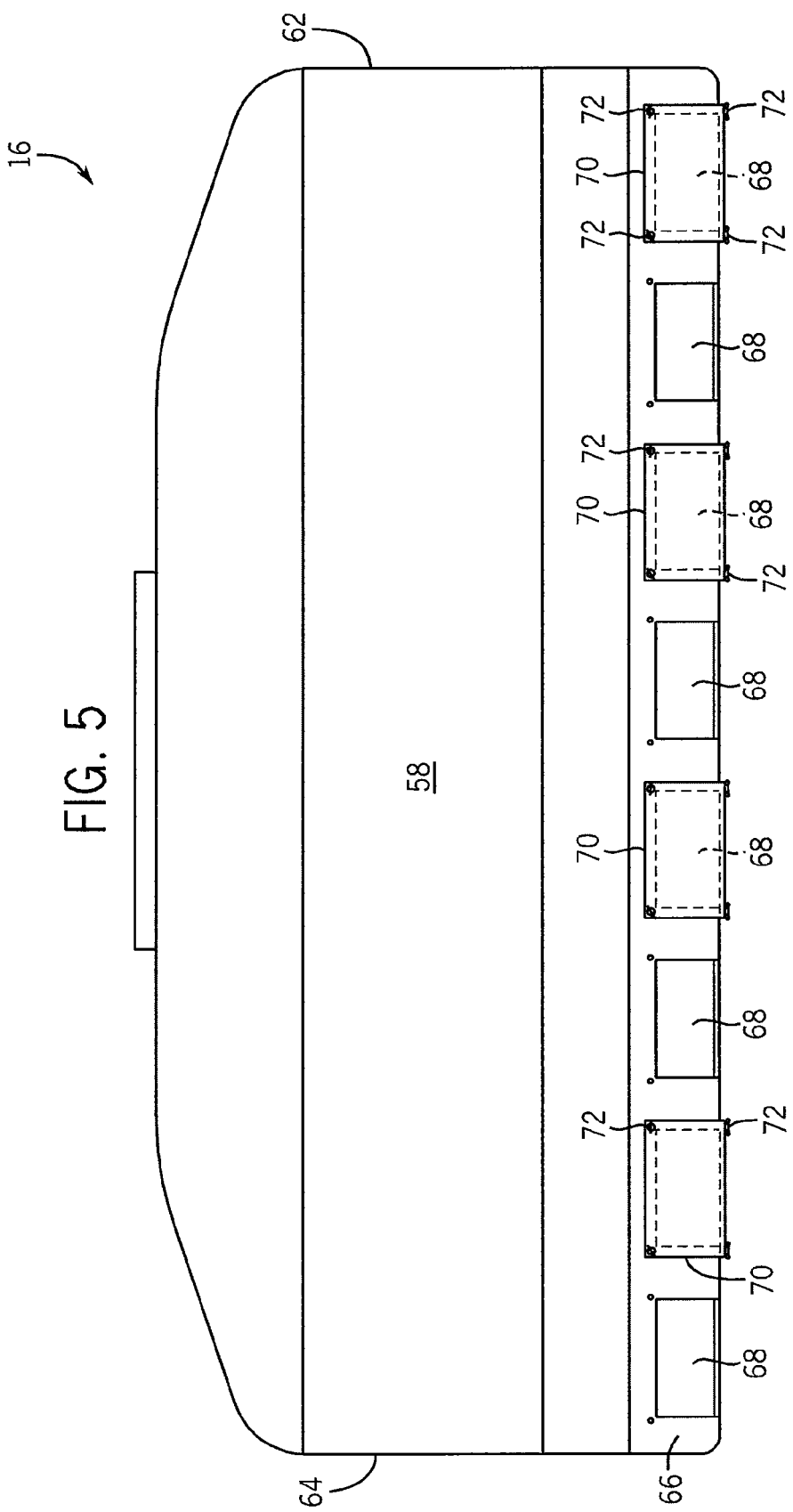

SEED HOPPER FOR SEED METERING SYSTEM HAVING MODULAR SEED METERING UNITS

BACKGROUND OF THE INVENTION

The present invention relates to farm implements and, more particularly, to a seed metering assembly having individualized and independently controlled metering units for supplying granular material such as seed or fertilizer to a plurality of distribution headers.

Air seeders are commonly towed by tractors to apply seed, fertilizer, or micro-nutrients or any granular product to a field. For purposes of this application "seeding" shall include the application or deposition of any granular or particulate material onto a field, and "seed" shall include seed, fertilizer, micronutrients, or any other granular material that may be applied onto a planting surface, farm field, seedbed, and the like. It is generally advantageous to tow an air seeder in combination with a tilling implement, one behind the other, to place the seed and fertilizer under the surface of the soil. An air seeder has as its central component a wheeled seed cart which comprises one or more frame-mounted seed tanks for holding product, generally seed or fertilizer or both. Air seeders also generally include a volumetric metering system operable to measure a fixed volume of seed per unit of linear distance and a pneumatic distribution system for delivering the product from the tank to the soil.

The volumetric metering system is configured for distribution of product from the tank to the distribution headers of the seed tubes. The metering system typically includes a meter roller assembly employing augers or fluted cylinders (meter rollers) situated in a meter box assembly secured below the tank.

Typically the meter box will have a series of outlets known as runs that each leads to the distribution lines of the pneumatic distribution system. The pneumatic distribution system generally includes an air stream operable to carry product metered by the meter roller assembly through the distribution lines to a series of secondary distribution manifolds ("headers"), which in turn distribute product to a group of ground openers mounted on the seeding implement operable to place seed in the ground. The ground openers are configured to evenly deliver the product to the span of ground (the "seedbed") acted upon by the seeding implement.

For most air seeders, the metering system mechanically separates the granular material into several runs; typically more than four runs, depending on the size of the seeding implement. As the size of seeding implements continue to increase as an effort to reduce seeding time and with the increasing costs of seed and fertilizer, it is increasingly desirable to stop the flow of granular material to one or more of the secondary headers, especially when the implement is passing over previously seeded or fertilized areas. Preventing the delivery of granular material to selected ones of the distribution runs is referred to as "sectional control" and is increasingly becoming an area of importance for air seeder design.

One proposed solution amounts to "starving" selected sections of the metering assembly. This is typically achieved by damning up the flow of granular material in the hopper so that the granular material is not presented to the meter roller assembly. One of the drawbacks of such a solution is that it is not uncommon for residual material to be against the meter roller assembly when the starving mechanisms, e.g., a gate or dam, are placed between the meter roller assembly and the hopper. As a result, there is a lag time between activation of the "starving" components and actual stoppage of seeding. This is particularly problematic for lightly seeded crops such canola in which it is possible for seeding to continue dozens of feet, e.g., 100 feet or more, after the "starving" components have been actuated.

Accordingly, there remains a desire for a seed metering assembly that provides effective sectional control.

SUMMARY OF THE INVENTION

The present invention is directed to a seed metering apparatus that has a series of individualized and independently controlled metering units and a hopper having a plurality of openings to discharge granular material to the series of metering units. Each seed metering unit is selectively driven by a common drive member, such as a drive shaft. Thus, when a seed metering unit is engaged with the drive member, the unit will meter granular material that is fed thereto through a respective opening in the hopper. The openings in the hopper may be selectively opened and closed so that the number of exposed openings matches the number of metering units. In this regard, the number of discharge openings for the hopper can be adapted to match the number of seed metering units.

Accordingly, in one aspect of the invention, a seed metering apparatus is provide that is capable of metering measured amounts of granular material to a number of secondary headers using a series of modular seed metering units that can be independently controlled to provide sectional control during seeding. Each seed metering unit is in fluid communication with a respective one of a plurality of openings formed in a discharge end of the hopper.

In a further aspect, each metering unit can be caused to run faster or slower than other metering units of the metering apparatus to provide additional control in the metering of seed, fertilizer or other granular material.

In accordance with another aspect of the invention, a modular seed metering unit or seed metering cassette is provided that allows a seed metering unit to be added or removed from a seed metering apparatus as a stand-alone component. In this regard, the needed number of seed metering units for a given air seeder can be achieved by stacking together modular units. As such, the present invention allows an air seeder to be built using modular components rather than using a single, fixed length meter roller. The invention also provides a hopper with a set of discharge openings that can be selectively exposed so that the number of discharge openings of the hopper can be matched to the number of modular seed metering units of the air seeder.

It is therefore an object of the invention to provide a seed metering apparatus with sectional control and, more particularly, sectional control with a quick response time.

It is another object of the invention to provide a cassette-based seed metering unit in which multiple such units could be arranged together to form a seed metering apparatus.

It is another object of the invention to provide a hopper having discharge openings, the number of which can be adjusted to accommodate the number of seed metering units being used to meter granular material.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings:

FIGS. 4-5 are views of a bulk fill hopper of the seed metering apparatus of FIG. 1 according to another aspect of the invention.

DETAILED DESCRIPTION

Figure 1:
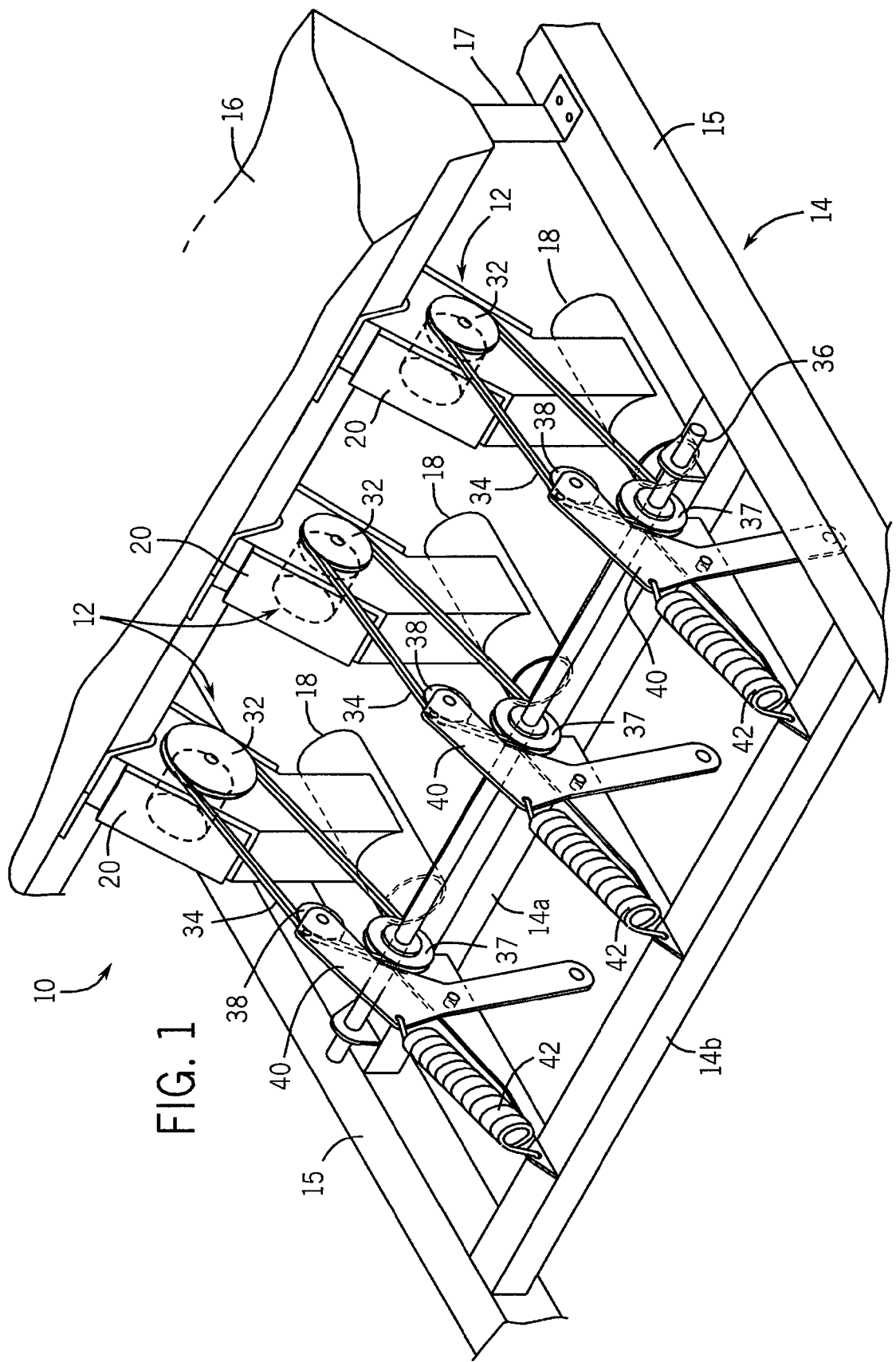
FIG. 1 is an isometric view of a seed metering apparatus for use with an air seeder according to one embodiment of the present invention.

Turning now to FIG. 1, a seed metering apparatus 10 for an air seeder (not shown) includes a series of seed metering units 12 each mounted to a seeder frame 14, e.g., frame crossbar 14a, adjacently below a hopper 16. In one embodiment, the frame 14 includes the aforementioned crossbar 14a and an upland crossbar 14b that are interconnected between a pair of parallel rails 15. Each seed metering unit 12 is designed to meter granular material, e.g., seed or fertilizer, from the hopper 16 to one or more delivery conduits 18. The hopper 16 is mounted to the parallel rails 15 in a conventional manner, i.e., by mounts 17. It will thus be appreciated that the seed metering units 12 are supported at one end by a connection to crossbar 14a and supported at an opposite end by hopper 16.

As will be described more fully below, each seed metering unit 12 is a self-contained, modular, and individual assembly. In this regard, the number of seed metering units for a given seed metering apparatus may vary from that shown in figures. Moreover, the modularity of the seed metering units 12 allows the number of seed metering units to be matched to the number of secondary headers (not shown) of the air seeder. Further, the present invention allows seed metering units to be added to a given air seeder as needed. Additionally, as will be described, each metering unit can be independently controlled. Thus, each metering unit can meter granular material at a speed that is independent of the meter rates of other metering units. This is particularly advantageous for air seeders having secondary headers with differing number of outlets.

Figure 2:
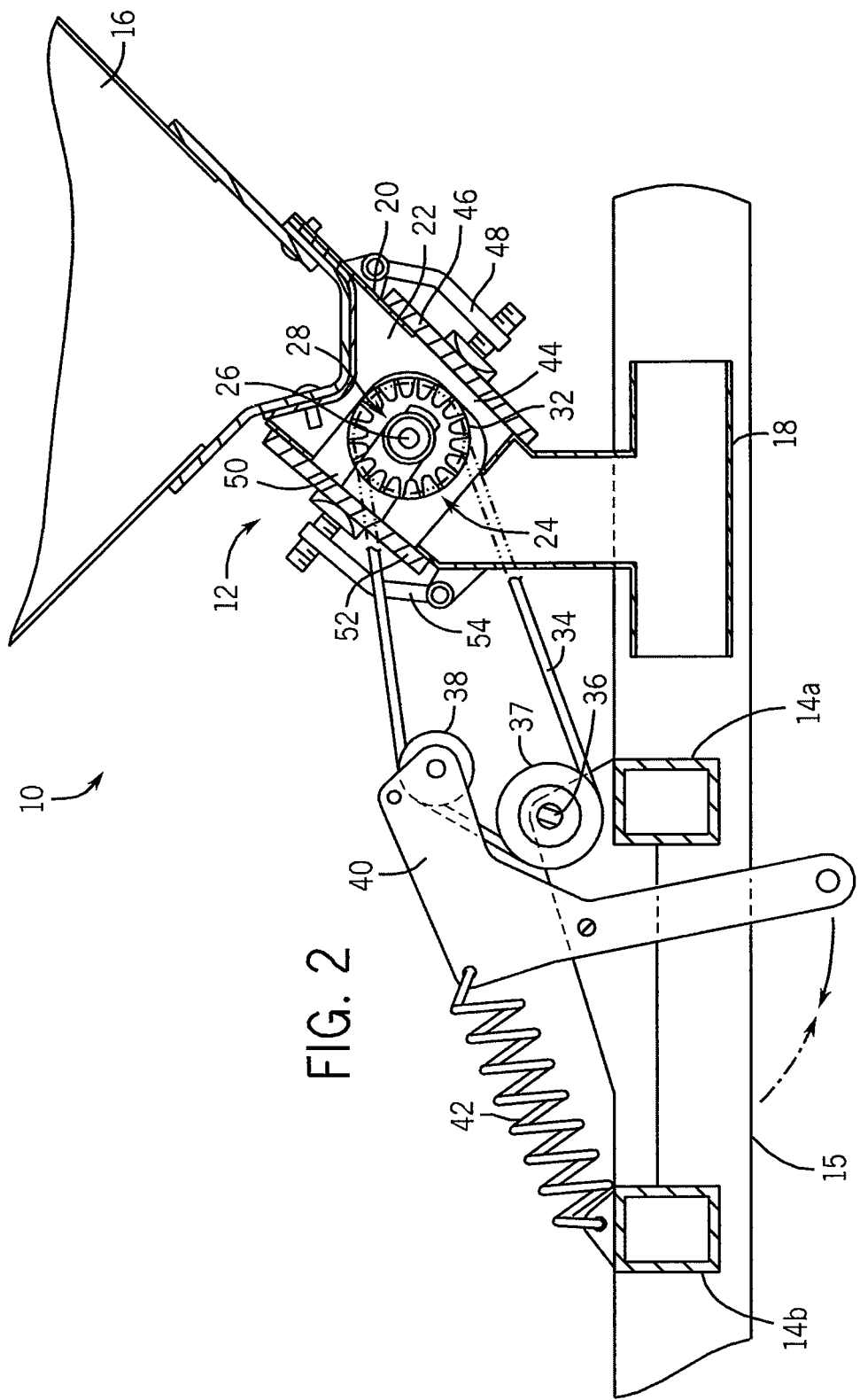
FIG. 2 is a side elevation view of the seed metering apparatus of FIG. 1.
Figure 3:
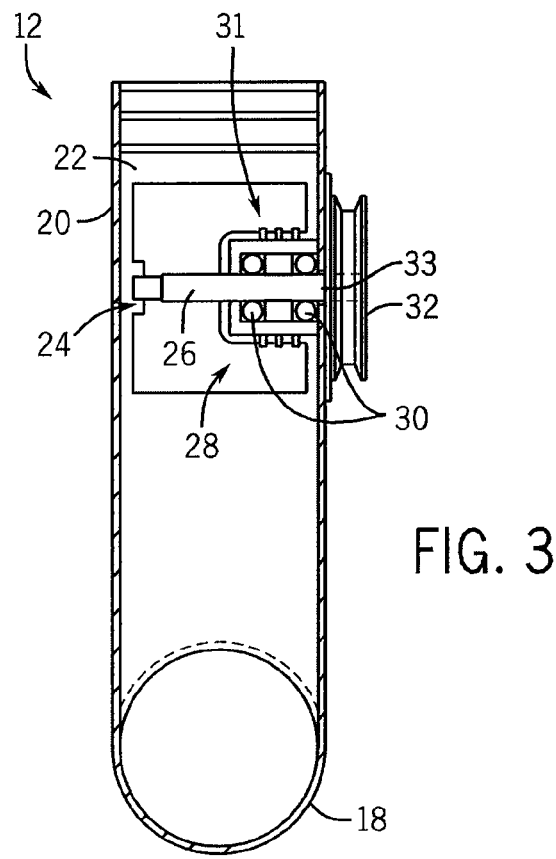
FIG. 3 is a rear view of one seed metering unit of the seed metering apparatus of FIG. 1.

With additional reference to FIGS. 2 and 3, each metering unit 12 has a bulkhead 20 that defines a cavity 22 containing a meter roller assembly 24. The meter roller assembly 24 includes a fluted rotor 26 that is rotatably mounted to bulkhead 20 by a bearing assembly 28, which includes a bearing 30. O-rings 31 provide sealing of the rotor 26 in the bulkhead 20. As known in the art, when the rotor 26 rotates, the fluted rotor 26 captures granular material as it falls from the hopper 16 and passes the captured granular material to the delivery conduits associated with the seed metering unit 12.

Each fluted rotor 26 further has a pulley 32 that is mounted to, or integrally formed with, the rotor 26. In the illustrated example, an end of the rotor 26 passes through an opening 33 formed in the bulkhead. The pulley 32 is attached to the exposed portion of the rotor 26. Each pulley 32 is caused to rotate by a drive belt 34 that is entrained about the pulley 32 and a drive shaft 36. As shown particularly in FIG. 1, a series of pulleys 37 are mounted to the drive shaft 36 and thus rotate with rotation of the drive shaft 36. Each drive belt is each entrained about a respective pulley 32 and a respective drive pulley 37. In this regard, a single and common drive shaft 36 is used to cause rotation of the fluted rotors 26. In a preferred embodiment, drive belts 34 are each V-belts, but it is understood that other types of elongated members could be used, such as chains, links, cable, and the like.

When drive shaft 36 rotates, the drive belts 34 are caused to translate around the drive shaft and their respective pulleys 32 to cause rotation of the fluted rotor 26 and ultimately metering of granular material passed from the hopper 16 to the seed metering unit 12. The present invention, however, provides sectional control of the seeding process. In this regard, each metering unit 12 also includes an idler roller 38 that is mounted to a bell crank 40. The bell cranks 40 are pivotably mounted to the seeder frame 14 in a conventional manner. In addition to being entrained about pulley 32 and drive shaft 36, each drive belt 34 is also entrained about a respective idler roller or pulley 38. Each idler roller 38 is designed to add or remove tension to its associated drive belt 34. When the drive belt 34 is tensioned, rotation of the drive shaft 36 will cause translation of the drive belt 34 and thus rotation of the pulley 32. On the other hand, when there is sufficient slack in the drive belt, the drive belt 34 will be loosely entrained about the drive shaft 36 and, as a result, rotation of the drive shaft 36 will not cause translation of the drive belt 34. Accordingly, when there is sufficient slack in the drive belt 34, rotation of the drive shaft 36 will not cause rotation of the fluted rotor 26. It will thus be appreciated that sectional control can be achieved by selectively disengaging a selected seed metering unit from tensioned engagement with the drive shaft 36.

Movement of the idler roller 38 is controlled by a respective bell crank 40. In this regard, the bell crank 40 is movable between an engaged position and a disengaged position. A tensioning spring 42 is interconnected with the seeder frame 14, e.g., crossbar 14b, and the bell crank 40 to bias the bell crank 40, and thus the drive belt 34, in the engaged position. In a preferred embodiment, each bell crank 40 is linked to a drive input (not shown) that is operative to move the bell crank 40 between the engaged and disengaged positions. The drive input may be any known or to be developed input device. For example, a hydraulic, pneumatic, mechanical, or electrical circuit could be used to move the bell crank 40 between the engaged and disengaged positions. Moreover, it is contemplated that each input device may be controlled via an operator input or controlled automatically, such as by a GPS-based control.

In one preferred embodiment, a single input device is used to simultaneously move a set of bell cranks 40 to effectuate engagement/disengagement of a set of seed metering units 12. This "tying" of multiple seed metering units 12 to a single input device allows all of the seed metering units 12 feeding granular material to a given secondary header to be started or stopped at the same time. While the seed metering units can be grouped together and thus controlled by a shared input device, the present invention is not so limited. Each seed metering unit, or a given group of seed metering units, can be selectively disengaged from the common drive shaft to effectively stop the metering by the selected seed metering units. It will thus be appreciated that the invention provides sectional control without mechanical gates or similar devices.

Additionally, the modularity of the seed metering units and the independent coupling of each seed metering unit to the drive shaft effectively provides a cartridge or cassette that can be added on an as-needed basis to a given air seeder. Moreover, because each seed metering unit is a separate stand-alone cartridge, metering units will different characteristics can be used on a single air seeder. For example, a larger pulley 32 could be used for one seed metering unit to provide metering at a slower rate and a smaller pulley 32 could be used for another seed metering unit to provide metering at a faster rate. This modularity could be particularly advantageous in instances in which it is desirable to meter seed and fertilizer at different rates.

Referring briefly again to FIG. 2, the bulkhead 20, in one preferred embodiment, has a pair of service openings. One service opening is a drain port 44 that is formed in the lower end of the bulkhead 20. The drain port 44, when opened, allows granular material to be drained from the hopper. The drain port 44 is selectively opened and closed by a drain door or panel 46 that is pivotably mounted to the hopper 16 by linkage 48.

Generally opposite the drain port 44 is an access opening 50. The access opening 50 is sized to allow removal of the rotor 26 when disconnected from the rotor bearing assembly 28. The access opening 50 is opened and closed by an access panel 52 that is pivotably mounted to a lower end of the bulkhead 20 by linkage 54.

Figure 4:
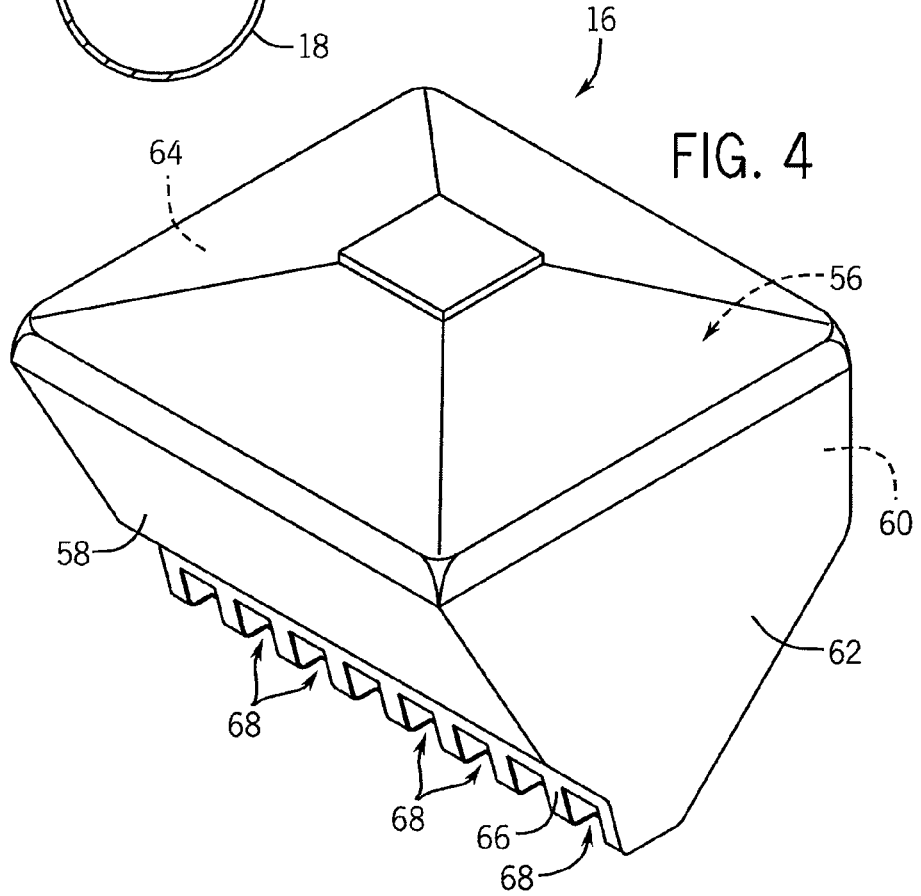

Referring now to FIGS. 4-5, hopper 16 has an internal volume 56 defined by a front panel 58, rear panel 60, and side panels 62, 64. The hopper 16 further has a lower panel 66. The panels are interconnected in a known manner or could be integrally formed as a single unit. In one preferred embodiment, the lower panel 66 includes a series of openings 68. The number of openings 68 is matched to the number of seed metering units 12. It will thus be appreciated that the invention provides a hopper 16 that can be quickly serviced to provide a number of discharge openings matched to the number of seed metering units. In one embodiment, each opening 68 can be closed as needed by a cover plate 70 which is secured to the lower panel 66 using conventional fasteners, such as wing nuts 72. Alternately, it is contemplated that the lower panel has linearly spaced knockouts. When a knockout is removed, a corresponding opening in the lower panel is exposed. In one embodiment, the knockouts cannot be reattached to the lower panel; although, other embodiments may have re-attachable knockouts. Additionally, it is contemplated that other types of devices may be used to selectively form discharge openings in the lower panel, such as slidable or removable doors, louvers, and the like.

While a drive belt and pulley arrangement is shown in the figures and has been described above, it is understood that other types of arrangements could be used, such as gears, clutches, individual electric motors or hydraulic motors, and the like.

From the foregoing it will be appreciated that the present invention provides a seed metering apparatus capable of metering measured amounts of granular material to a number of secondary headers using a series of modular seed metering units that can be independently controlled to provide sectional control during seeding. Each metering unit can be caused to run faster or slower than other metering units of the metering apparatus. Moreover, the modularity of the present invention allows each seed metering unit to be added or removed from the seed metering apparatus as a stand-along cartridge or cassette. It will also be appreciated that the present invention provides sectional control with a quickened response time. When the drive belt for a given seed metering unit is loosened as a result of its bell crank being moved to the disengaged position, the meter roller for the seed metering unit will stop nearly instantaneously. As such, the present invention avoids the shut-off lag times typically associated with sectional control.

Many changes and modifications could be made to the invention without departing from the spirit thereof. The scope of these changes will become apparent from the appended claims.

The invention claimed is:

1. A seed metering apparatus for a farm implement, comprising:
   a hopper sized to hold a volume of granular material, the hopper having a first end for receiving granular material and a second end for discharging granular material and wherein the second end includes a plurality of openings;
   a drive shaft;
   a plurality of modular seed metering units, each seed metering unit independently moveable between an engaged condition wherein a seed metering unit is remote from and operatively engaged with the drive shaft and aligned to receive granular material from the hopper through a respective one of the plurality of openings and a disengaged condition wherein the seed metering unit is operatively disengaged from the drive shaft; and
   a plurality of drive arrangements, each drive arrangement operatively connecting a corresponding one of the plurality of modular seed metering units to the drive shaft with the corresponding one of the plurality of modular seed metering units in the engaged condition and isolating the corresponding one of the plurality of modular seed metering units from the drive shaft with the corresponding one of the plurality of modular seed metering units in the disengaged condition.

2. The seed metering apparatus of claim 1 wherein the second end of the hopper includes a set of knockouts and wherein each knockout, when removed, forms a respective one of the plurality of openings in the second end of the hopper.

3. The seed metering apparatus of claim 2 wherein each knockout is reattachable to the hopper to selectively close a respective one of the plurality of openings in the second end of the hopper.

4. The seed metering apparatus of claim 2 wherein the hopper further includes a plurality of panels for the plurality of openings, and wherein each panel is independently movable to expose a respective one of the plurality of openings formed in the second end of the hopper.

5. The seed metering apparatus of claim 1 wherein each drive arrangement is configured to selectively drivingly engage a respective modular seed metering unit with the drive shaft with the modular seed metering unit in the engaged condition.

6. The seed metering apparatus of claim 5 wherein each modular seed metering unit includes a meter roller configured to meter granular material from a respective one of the plurality of openings formed in the second end of the hopper to one or more corresponding delivery runs and the drive arrangement includes a drive member interconnected with the meter roller and the drive shaft with the modular seed metering unit in the engaged condition.

7. The seed metering apparatus of claim 6 wherein each meter roller includes a drive hub and wherein each drive member includes an elongated member entrained about the drive hub and the drive shaft.

8. The seed metering assembly of claim 7 wherein the elongated member is a belt.

9. The seed metering assembly of claim 8 wherein the elongated member is a V-belt.

10. The seed metering assembly of claim 7 further comprising an idler roller, and wherein the elongated member is further entrained around the idler roller.

11. The seed meting assembly of claim 10 further comprising a bell crank coupled to the idler roller and configured to move the idler roller to tension the elongated member.

12. The seed metering assembly of claim 11 further comprising a tensioning spring that applies a biasing force on the bell crank.

\* \* \* \* \*